(12) United States Patent
Gopalakrishnan et al.

(10) Patent No.: US 7,426,196 B2
(45) Date of Patent: Sep. 16, 2008

(54) METHOD AND APPARATUS FOR MANAGING PACKET DATA RESOURCES

(75) Inventors: Nandu Gopalakrishnan, Chatham, NJ (US); Niranjan S. Joshi, Morris Plains, NJ (US); Srinivas R. Kadaba, Chatham, NJ (US); Ashok N. Rudrapatna, Basking Ridge, NJ (US); Ganapathy S. Sundaram, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 514 days.

(21) Appl. No.: 11/046,489

(22) Filed: Jan. 28, 2005

(65) Prior Publication Data

US 2006/0171307 A1 Aug. 3, 2006

(51) Int. Cl.
*H04Q 7/00* (2006.01)

(52) U.S. Cl. ............... 370/328; 370/395.4; 370/395.42; 455/452.2; 455/450

(58) Field of Classification Search ................. 370/328, 370/395.4, 395.42; 455/452.2, 450
See application file for complete search history.

(56) References Cited

U.S. PATENT DOCUMENTS

| | | | |
|---|---|---|---|
| 5,583,914 A | 12/1996 | Chang et al. ............... 455/466 |
| 6,108,374 A | 8/2000 | Balachandran et al. ...... 375/227 |
| 6,215,827 B1 | 4/2001 | Balachandran et al. ...... 375/262 |
| 6,335,922 B1 | 1/2002 | Tiedemann |
| 6,502,062 B1 | 12/2002 | Acharya et al. ............. 702/186 |
| 6,519,462 B1 | 2/2003 | Lu et al. ...................... 455/453 |
| 6,545,975 B1 | 4/2003 | Giardina et al. ............. 370/208 |
| 6,731,618 B1 | 5/2004 | Chung et al. |
| 6,751,480 B2 | 6/2004 | Kogiantis et al. ........ 455/562.1 |
| 6,778,496 B1 | 8/2004 | Meempat et al. ............ 370/230 |
| 6,801,790 B2 | 10/2004 | Rudrapatna ............... 455/562.1 |
| 6,829,470 B2 | 12/2004 | Kogiantis et al. ........... 455/101 |
| 6,836,666 B2 | 12/2004 | Gopalakrishnan et al. ........................ 455/452.2 |
| 2003/0110286 A1* | 6/2003 | Antal et al. .................. 709/236 |
| 2003/0152083 A1* | 8/2003 | Nagata et al. ............. 370/395.4 |
| 2003/0166408 A1 | 9/2003 | Zhang et al. |
| 2003/0202461 A1 | 10/2003 | You et al. |
| 2003/0214951 A1 | 11/2003 | Joshi et al. ............. 370/395.42 |
| 2004/0062318 A1 | 4/2004 | Yu et al. |
| 2004/0083477 A1 | 4/2004 | Acharya et al. ............. 718/102 |

(Continued)

FOREIGN PATENT DOCUMENTS

EP 1309120 A 5/2003

(Continued)

OTHER PUBLICATIONS

U.S. Appl. No. 09/569,684, titled "Wireless Data Transmission Scheduling".

(Continued)

*Primary Examiner*—Danh C Le (57) ABSTRACT

An apparatus and a method for managing resources for efficient packet data transmission. More specifically, there is provided a method for allocating transmission resources in a base station comprising determining a largest supportable packet size for a highest priority user, wherein the determination is based at least partially on the available modulation types, a total number of codes available for packet transmission, a total amount of available transmission power available for packet transmission, and frame durations supported by a base station.

19 Claims, 6 Drawing Sheets

U.S. PATENT DOCUMENTS

| | | | |
|---|---|---|---|
| 2004/0100941 A1* | 5/2004 | Lim et al. | 370/349 |
| 2004/0203968 A1 | 10/2004 | Gopalakrishnan | |
| 2004/0214602 A1* | 10/2004 | Aoyama | 455/561 |
| 2007/0081498 A1* | 4/2007 | Niwano | 370/335 |

FOREIGN PATENT DOCUMENTS

| | | |
|---|---|---|
| EP | 1 335 556 A1 | 8/2003 |

OTHER PUBLICATIONS

3GPP TR 25.848 V4.0.0 (Mar. 2001) Technical Report titled 3$^{rd}$ Generation Partnership Project; Technical Specification Group Radio Access Network; Physical layer aspects of UTRA High Speed Downlink Packet Access (Release 4) 3GPP.

Anthony C.K. Soong, Seong-Jun Oh, Aleksander D. Damnjanovic, and Young C. Yoon, Forward High-Speed Wireless Packet Data Service in IS-2000—1×EV-DV, IEEE Communications Magazine, Aug. 2003, pp. 170-177.

* cited by examiner

| Encoder Packet Size (bits) | Number of Walsh Codes | Per Slot Data Rate (kbps) | Number of Slots in Sub-Packet | Modulation Order | Chip Energy Required |
|---|---|---|---|---|---|
| 3864 | 26 | 1545.6 | 1 | 4 | 10.2189 |
| 3864 | 13 | 1545.6 | 2 | 4 | 7.2086 |
| 3864 | 14 | 1545.6 | 2 | 4 | 6.7027 |
| 3864 | 15 | 1545.6 | 2 | 4 | 6.2643 |
| 3864 | 17 | 1545.6 | 2 | 4 | 5.5510 |
| 3864 | 19 | 1545.6 | 2 | 4 | 5.0495 |
| 3864 | 21 | 1545.6 | 2 | 3 | 5.0987 |
| 3864 | 23 | 1545.6 | 2 | 3 | 4.5753 |
| 3864 | 25 | 1545.6 | 2 | 3 | 4.2370 |
| 3864 | 27 | 1545.6 | 2 | 2 | 3.8483 |
| ⋮ | | | | | |
| 3096 | 6 | 619.2 | 4 | 4 | 2.2383 |
| 3096 | 7 | 619.2 | 4 | 4 | 1.3867 |
| 3096 | 8 | 619.2 | 4 | 4 | 0.8288 |
| 3096 | 9 | 619.2 | 4 | 3 | 06836 |
| 3096 | 10 | 619.2 | 4 | 3 | 0.2566 |
| 3096 | 11 | 619.2 | 4 | 2 | -0.2123 |
| 3096 | 13 | 619.2 | 4 | 2 | -0.9453 |
| 3096 | 16 | 619.2 | 4 | 2 | -1.4609 |
| 3096 | 20 | 619.2 | 4 | 2 | -1.8640 |
| ⋮ | | | | | |
| 408 | 1 | 81.6 | 4 | 4 | -7.1279 |
| 408 | 2 | 81.6 | 4 | 2 | -9.6201 |
| 408 | 3 | 81.6 | 4 | 2 | -10.3246 |
| 408 | 4 | 81.6 | 4 | 2 | -10.6079 |

FIG. 5

METHOD AND APPARATUS FOR MANAGING PACKET DATA RESOURCES

BACKGROUND OF THE INVENTION

1. Field of the Invention

The present invention relates generally to telecommunications and, more particularly, to wireless telecommunication systems.

2. Description of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Over the past few years, cellular phone systems that permit packet transmission, such as 1×Evolution Voice—Data Voice ("1×EV-DV"), High Speed Downlink Packet Access ("HSDPA"), and other similar systems, have greatly increased the potential capacity of the cellular systems. However, this capacity is still limited, and cellular providers are constantly searching for new and better ways to efficiently and profitably divide up this capacity amongst the most users. There are many factors that can influence or affect how cellular providers choose to divide the available bandwidth.

First, there are a limited number of channelization/Walsh codes that are available to be distributed amongst the mobile devices in the cellular system. In addition, many of these Walsh codes are used by non-packet, legacy channels, such as the pilot channel and the paging channel. As such, one of the challenges presenting the operators of cellular systems is how to manage the allocation of the remaining Walsh codes to support the most users while maintaining a low Frame Error Rate ("FER") (e.g., 1% FER).

Second, there is also a limited amount of transmission power available in the cellular system. All things being equal, signals (e.g., phone calls) transmitted with higher transmission power have fewer errors. Unfortunately, transmission power is not unlimited; it must be sub-divided amongst the users of the cellular system while maintaining a certain threshold quality level. As such, another challenge for the operators of cellular is maximizing the number of users that can share the available power while maintaining the quality level.

Third, cellular providers are interested in allocating bandwidth and throughput based on the Quality of Service ("QoS") parameters for each mobile device. QoS is a protocol that enables differentiation between types of applications or services on the cellular network. These QoS parameters include delay, jitter, throughput, and error rate. To improve efficiency, modern cellular systems may assign bandwidth and throughput based on the QoS parameters for each particular application or service. For example, voice services are delay sensitive but error tolerant, whereas web browsing is delay tolerant but error sensitive. This is the case because users are willing to tolerate an occasional error in a conversation but not a long gap in the phone conversation. Conversely, consumers are willing tolerate a delay to download a web page but not errors on the web page. The particular QoS parameters may be determined by the operators of the cellular service and may vary greatly depending on the particular service provided. Efficiently managing the bandwidth and throughput to each of the mobile devices based on QoS parameters may be beneficial.

Fourth, with rapid growth of data based-services, such as wireless Internet, cellular providers are also concerned with the Grade of Service ("GoS"). GoS is a protocol that enables differentiation between different classes of users. GoS may permit the cellular provider to sell different services packages, referred to as GoS classes, at different prices. For example, a more expensive access package may provide higher download speeds, while a less expensive access plan may only provide lower download speeds. A system that can provide a variety of price/performance packages may be commercially advantageous to cellular service providers.

Fifth, modern cellular systems may take into account fairness in allocating power and codes. In an ideal system, it would be possible to satisfy the requirements of every mobile device of every user instantaneously. However, for a variety of reasons, this is not possible in reality. As such, some users may encounter delays or errors. Fairness concerns may be directed towards insuring that these errors or delays are fairly apportioned amongst all of the users of the cellular system depending on GoS class.

A system that could manage packet transmission across 1×EV-DV, HSDPA, and other packet transmission networks based on the available the factors outlined above would be advantageous.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, there is provided a method for allocating transmission resources in a base station comprising determining a largest supportable packet size for a highest priority user, wherein the determination is based at least partially on a combination of available modulation types, a total number of codes available for packet transmission, a total amount of available transmission power available for packet transmission, and frame durations supported by a base station.

In another embodiment, there is provided a method for prioritizing a plurality of users of a cellular system comprising computing a deadline for each of the plurality of users, wherein deadline calculation is partially based on a channel rate for each of the plurality of users.

In yet another embodiment, there is provided a method of selecting a hybrid automatic repeat request process for a transmission in a cellular system comprising identifying the hybrid automatic repeat request processes for a mobile device, wherein identifying the process comprises identifying one or more free hybrid automatic repeat request processes and selecting one of the one or more free hybrid automatic repeat request processes, wherein the selecting comprises selecting the hybrid automatic repeat request with the earliest time stamp.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Several of the techniques discussed below may improve the management of packets in a packet transmission network, such as a 1×EV-DV network or a HSDPA network. For example, a technique that could allocate the available power and Walsh codes amongst a plurality of users may be beneficial. Second, a technique for ranking a plurality of users based on signal timing, user channel conditions, QoS, GoS, and fairness may also be advantageous. Third, a technique to determine the optimal HARQ process to use for a particular transmission may also be beneficial. Embodiments employing all of these techniques will be discussed in detail below.

Figure 1:
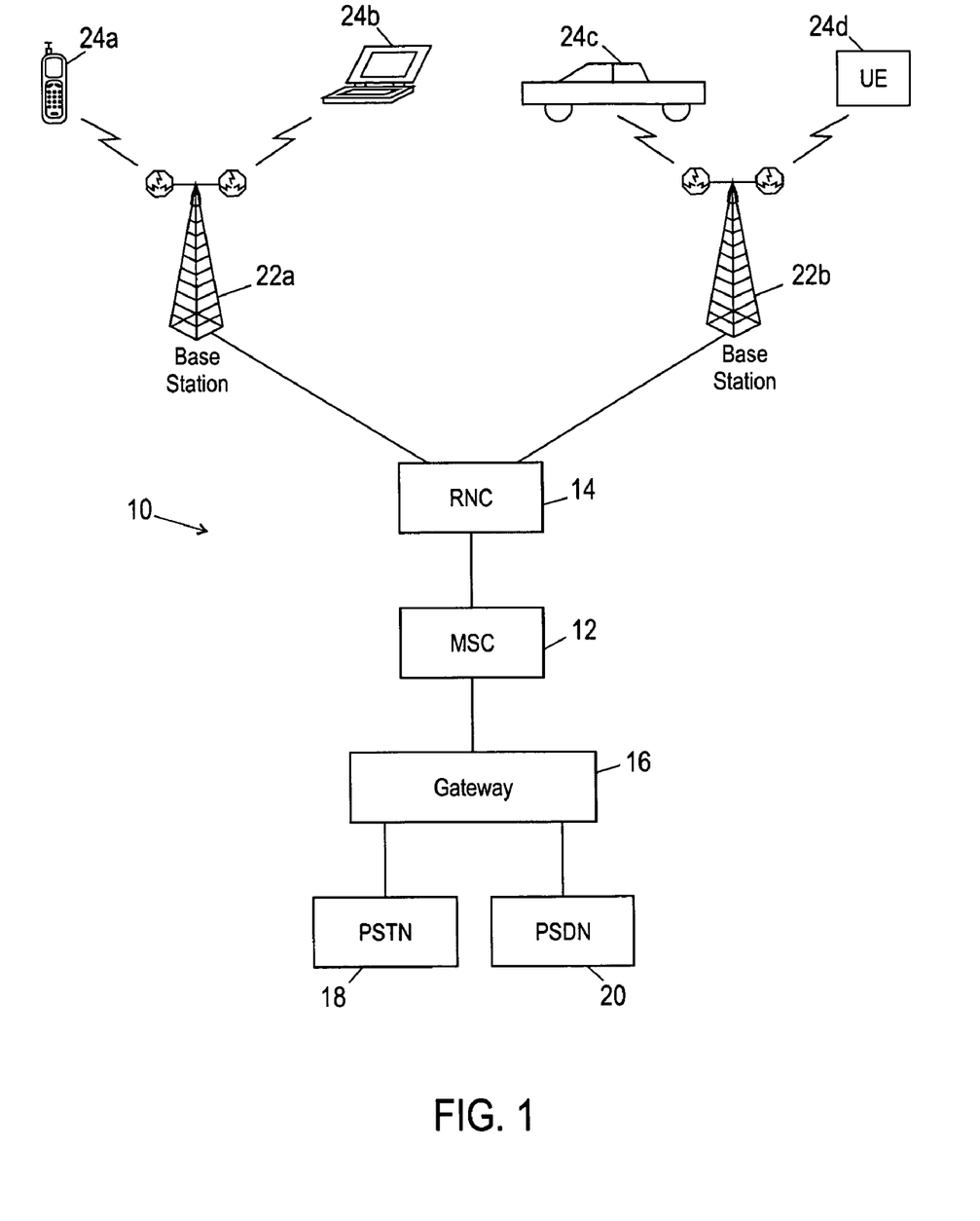
FIG. 1 discloses an exemplary cellular system in accordance with an exemplary embodiment of the present invention.

Turning now to the drawings, and referring initially to FIG. 1, which is an exemplary wireless communication system that is illustrated and designated by a reference numeral 10. In any given cellular market, such as a typical metropolitan area, the wireless communications system 10, or cellular network, may include at least one mobile switching center ("MSC") 12. The MSC 12 is the switch that serves the wireless system, and it performs the function of switching calls to the appropriate destination and maintaining the connection. Indeed, the primary purpose of the MSC 12 is to provide a voice or data path connection between a mobile telephone another telephone, such as another mobile telephone or a land-line telephone. A typical MSC 12 includes a number of devices that control switching functions, call processing, channel assignments, data interfaces, tracking, paging, call hand-off, billing, and user data bases.

The MSC 12 may be coupled to a gateway 16, which may in turn be coupled to Public Switched Telephone Network 18 ("PSTN"), which is often referred to as a land-line telephone network. A typical cellular network includes a connection to the PSTN because a majority of all cellular telephone calls pass through the PSTN. The gateway 16 may also be coupled to a Packet Switched Data Network 20, such as the Internet, so as to provide Internet service to the cellular subscribers.

One or more Radio Network Controllers ("RNC") 14 may also be coupled to the MSC 12. Amongst other things, the RNC 14 may determine a pool of long-term active users of the cellular network 10. The process for determining the pool of long-term active users is well known to those skilled in the art. The RNC may transmit this user list to one or more base stations 22a, b. As will be described in more detail below, depending on the configuration of the cellular system 10, the base station 22a,b may be a base transceiver station ("BTS"), a Node B, or another type of transceiver system.

The RNC 14 may also assign a MAC ID or other form of unique identifier ("UI") to each user in the pool of long-term active users. In alternate embodiments, the base station 22a,b may assign the MAC ID. Further, the RNC 14 may determine which Walsh or channelization codes are currently available for the shared packet data and control channels and may transmit this information to each of the base stations 22a, 22b. In particular, the RNC 14 may determine which codes are available to allocate to the high speed packet data channels (F-PDCH in 1×EV-DV and HS-DSCH in HSDPA), after the codes for legacy channels (the non-packet channels) and the control channels for packet data operation (F-PDCCH's and F-CPCCH's in 1×EV-DV and HS-SCCH's and DL-DPCCH's in HSDPA) have been allocated. In alternate embodiments, the base stations 22a, 22b may perform these functions.

The RNC 14 may also provide QoS and GoS information to the base stations 22a, b. As described above, Quality of Service ("QoS") is the protocol that enables differentiation between applications and or services, such as voice over Internet protocol ("VoIP"), file downloads (FTP), and web pages (HTTP). Grade of Service ("GoS") is the protocol that enables differentiation between various classes of users. Amongst other things, the RNC 14 may provide QoS parameters and GoS classes to the base stations 22a, b.

Lastly, the RNC 14 may provide transmission power measurements from which the base station 22a, b may compute the power available to transmit the packet channels. In one embodiment, the RNC 14 may comprise a power detection module configured to provide instantaneous base station transmission power measurements for the shared packet data and control channels. The mechanisms that can provide this information are well known in the art. The RNC 14 may compute the estimated power available for the packet data and control channels by subtracting the estimated power required by the legacy channels from the maximum transmit power for a given time slot. The RNC 14 may transmit the power estimates to the base station 22a,b.

Next, the base stations 22a, b may be transmission and reception stations that act as access points for network traffic for variety of mobile devices 24a, 24b, 24c, and 24d. Typically the base station 22a, b will comprise the BTS in a 1×EV-DV system and will comprise a Node B in a HSDPA system. However, different configurations are possible in alternate embodiments. For example, the base station 22a, b may include antennas mounted on a tower or may include an antenna mounted on a building. Furthermore, the base station 22a, b may communicate voice or data with any suitable mobile device, such as portable cellular telephones 24a laptop computer 24b, vehicle-system 24c, or user equipment 24d. While only two base stations 22a, b are illustrated in FIG. 1, those skilled in the art will appreciate that any suitable number of base stations 22a,b may be coupled to the RNC 14.

Further, it should be understood that the base station 22a, b, and the mobile devices 24a, 24b, 24c, and 24d include, among many other things, a transceiver that transmits and receives signals over the air interface via an antenna.

Figure 2:
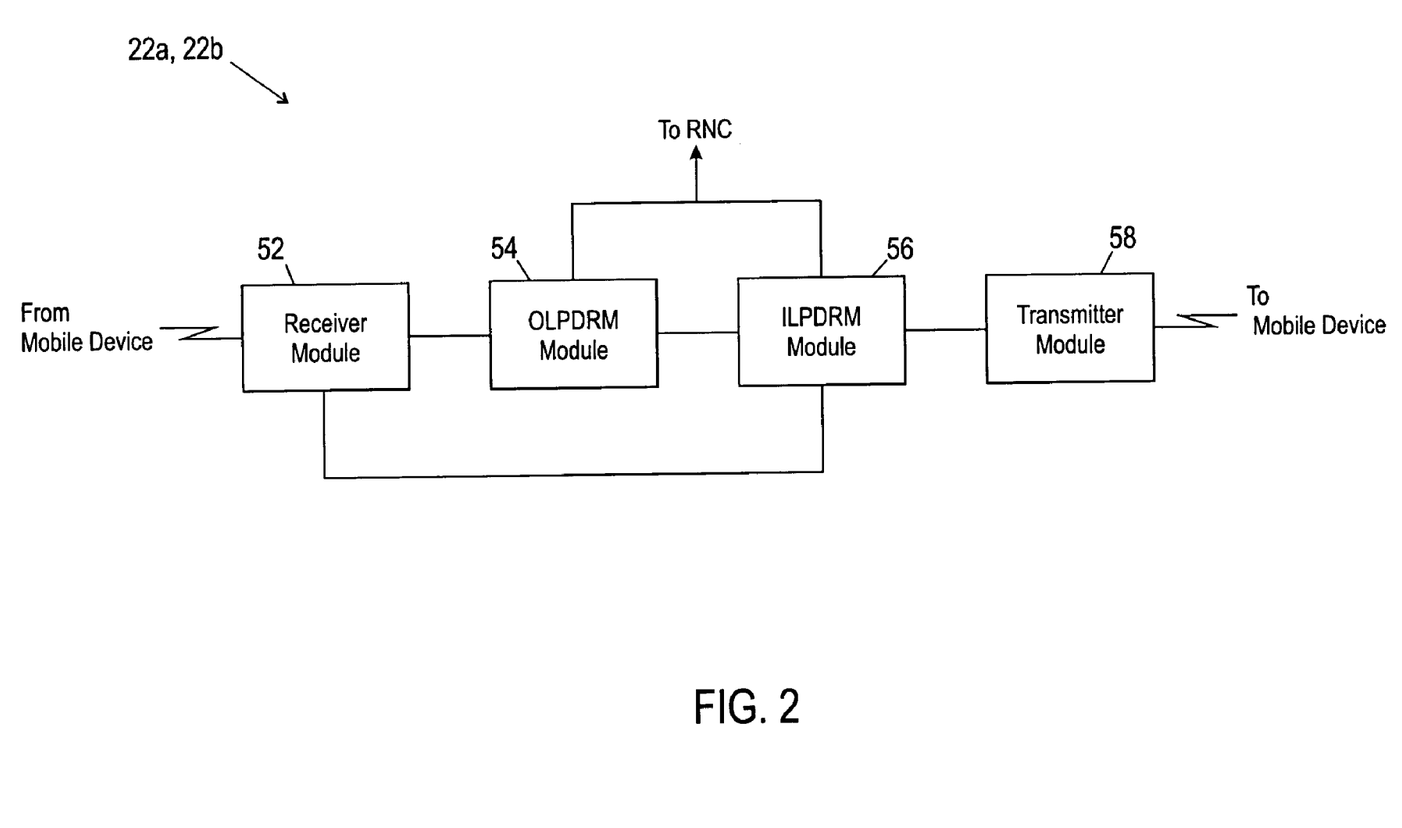
FIG. 2 illustrates a block diagram of an exemplary base station in accordance with an exemplary embodiment of the present invention.

Turning now to FIG. 2, an exemplary base station in accordance with embodiments of the present invention is illustrated. The base station 22a, b may comprise a receiver module 52, an outer loop packet data resource manager module ("OLPDRM" module) 54, an inner loop packet data resource manager module ("ILPDRM" module) 56, and a transmitter module 58. The modules (blocks 52, 54, 56, and 58) may be hardware, firmware, software, or some combination of hardware, firmware, and software. As will be described below, these modules may be configured to allocate the available power and Walsh codes amongst a plurality of users, to rank a plurality of users based on the signal timing, user channel conditions, user queue conditions, QoS, GoS, and fairness, or to determine the optimal hybrid ARQ process for each of the mobile devices 24a, b, c, and d. Those skilled in the art will appreciate that the embodiments described below are merely examples of systems capable of performing the above discussed functions. In other words, the modules shown in the blocks 52, 54, 56, and 58 are merely exemplary and other embodiments can be envisaged wherein the functions are split up differently or wherein some modules are not included or other modules are included. For example, in one embodiment, the functions of the ILPDRM module 56 and the OLPDRM module may be combined into a single module.

Figure 3A:
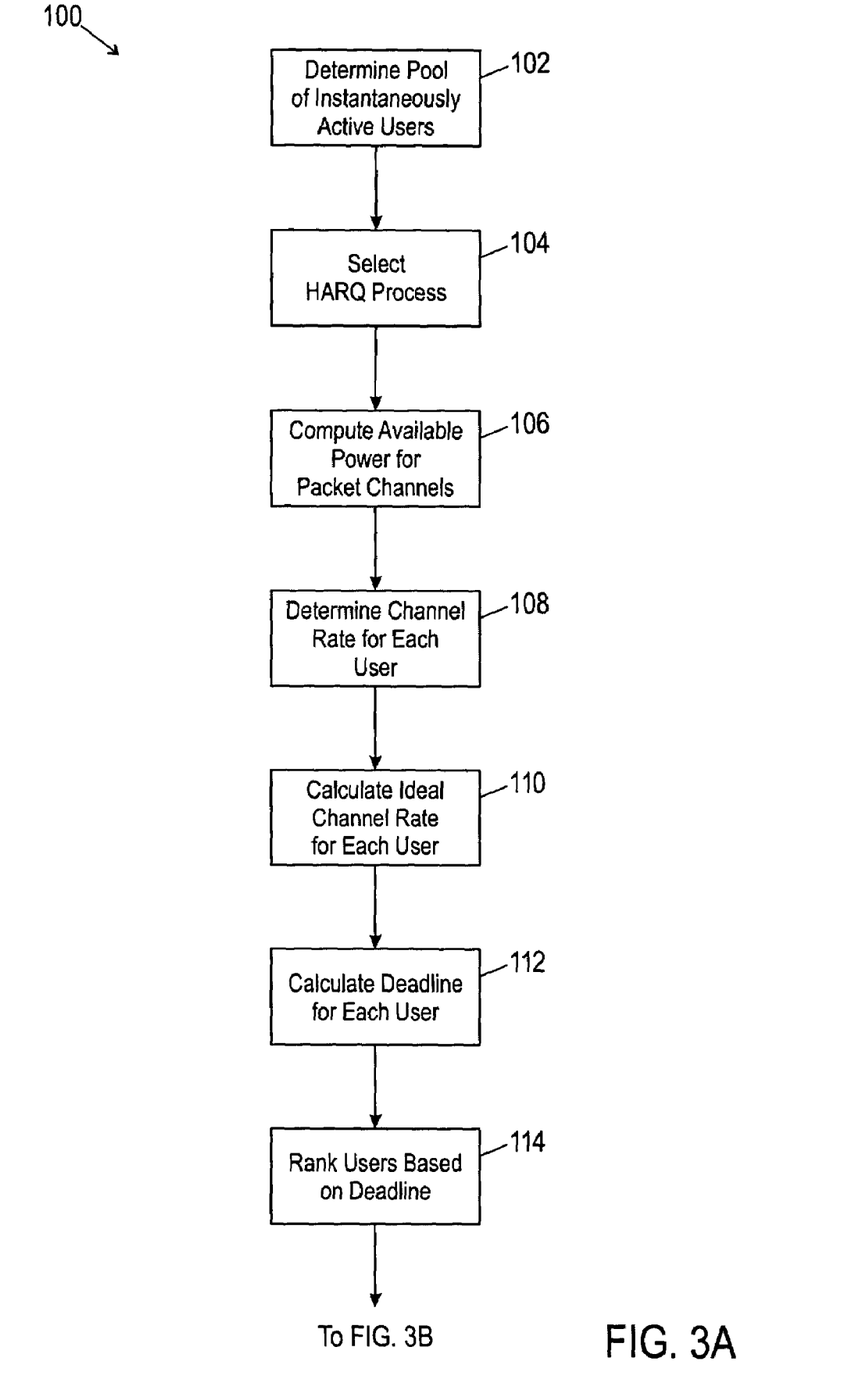
FIG. 3A illustrates a flow chart illustrating an exemplary technique for allocating power and codes amongst a plurality of users in accordance with exemplary embodiments of the present invention.

One exemplary technique that may be employed to allocate power and codes amongst a plurality of users is illustrated in FIG. 3A. This technique is generally designated by a reference numeral 100. In one embodiment, the technique 100 may be executed by the ILPDRM module 56. In alternate embodiments, the technique 100 may be executed elsewhere in the base station 22a, b. In still other embodiments, such as a 1×Evolution Voice-Data Only embodiment, the technique 100 may be executed within one of the mobile devices 24a, 24b, 24c, and 24d and transmitted to the base station 22a,b.

The technique 100 may begin by determining the pool of instantaneously active users, as indicated in block 102. The pool of instantaneously active users may comprise those users that have some form of transmission (e.g., data) waiting in queue in the base station 22a, b to be transmitted to them. In other words, the pool of instantaneously active users comprises a "to-do" list for the base station 22a,b. In one embodiment, the ILPRDM module 56 may update the pool of instantaneously active users after each frame or even after each round of multiplexing (also referred to as "CDMing" in CDMA systems). For the purposes of this specification, each of the mobile devices 24a, b, c, and d are considered to be in the pool of instantaneously active users.

Before continuing, it is important to note that a single mobile device 24a, b, c, and d may have multiple simultaneous traffic streams each comprising a different type of transmission (e.g., a web page and voice conversation). In one embodiment, each of these traffic streams may be stored in a separate buffer and may be treated (and referred to) as a separate user for the purposes of queuing and transmission.

Once the pool of instantaneously active users has been determined, the technique 100 may select a HARQ process for each of the traffic streams, as indicated in block 104. As described above, HARQ processes are logical queues that permit the cellular system 10 to manage the transmission of replacement packets to the mobile devices 24a, b, c, and d. The number of HARQ processes supported by a cellular system may vary in alternate embodiments. For example, in one 1×EV-DV embodiment, there may be four different on-going HARQ processes per mobile device 24a, b, c, and d. In one HSDPA embodiment, there may be eight on-going HARQ processes per mobile device 24a, b, c, and d.

Figure 4:
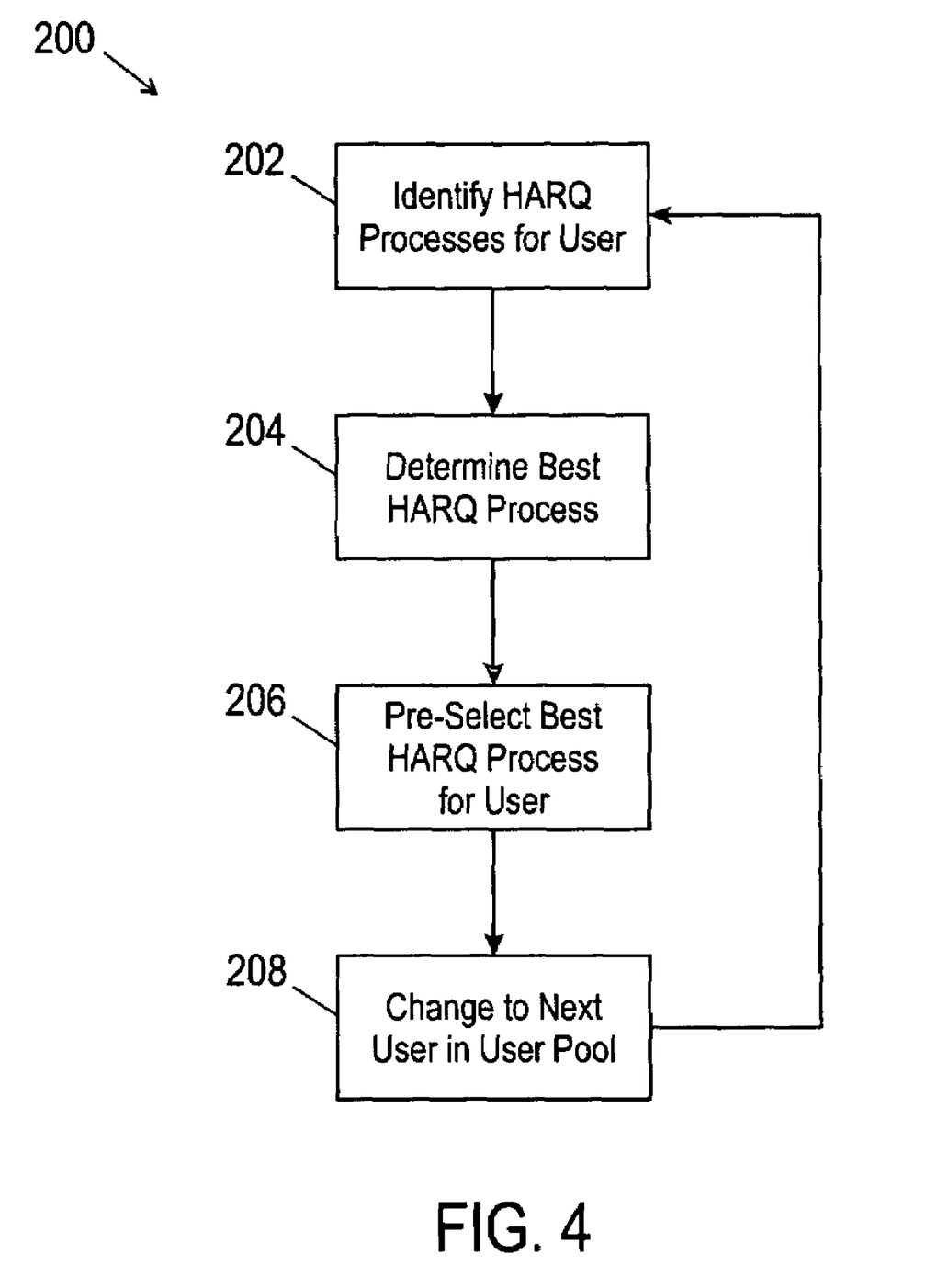
FIG. 4 illustrates a flow chart illustrating an exemplary technique for selecting a HARQ process in accordance with exemplary embodiments of the present invention.

One exemplary technique that may be employed by the base station 22a to select a HARQ process is illustrated in FIG. 4. This technique is generally designated by a reference numeral 200. The first step in technique 200 may be to identify the HARQ process type for each of the HARQ processes for a particular one of the mobile devices 24a, b, c, and d, as indicated in block 202. In one embodiment, there are two different types of HARQ processes: an outstanding HARQ process, which may be either "free" or not "free," and an empty HARQ process.

The outstanding HARQ process type is a process ID for which a packet has already been transmitted by the base station 22a, b at some previous time, but where the base station 22a is still awaiting a confirmation from the mobile device 24a, b, c, and d. While the outstanding HARQ process is awaiting an acknowledgement, it is considered to be not "free" and thus may not be employed to transmit additional information to the mobile device 24a, b, c, and d. In one embodiment, it may take four frames after transmission of a packet for the base station 22a to receive the acknowledgement. Once the base station 22a, b receives the acknowledgement (or a negative acknowledgement after maximum permitted rounds of transmissions or after some HARQ timeout value), it is considered free and the outstanding HARQ process can be employed to transmit additional packets.

The empty HARQ process type, on the other hand, is a process ID for which there is no unacknowledged data. Empty processes can be loaded with fresh packets from any of the traffic streams of the mobile device 24a, b, c, and d, if necessary. Those skilled in the art will appreciate that all empty hybrid ARQ processes are considered "free" by definition.

After identifying the HARQ processes for a given mobile device 24a, b, c, and d, the technique 200 may continue by selecting the "best" of the HARQ processes from which to choose replacement packets, as indicated in block 204. Only free HARQ processes can be considered for scheduling. From all the outstanding HARQ processes that are free for a given user u at time n and require retransmissions, the "best" one is chosen based on certain criteria for each traffic stream. In one embodiment, the criteria may be selected by the operators of the cellular system 10. Some example criteria that can be considered by the operators of a cellular system are described below.

First, the HARQ selection may be based on selecting those HARQ processes which need the least incremental energy per bit to pass the "supportability" test. In other words, this selection involves selecting the HARQ process that has accumulated the most energy per bit, and thus requires the least amount of additional energy to transmit the replacement packet. The remaining required energy per bit ("RREB") may be computed with respect to a reference modulation, code rate, and block size. Second, the HARQ selection may be based on selecting the outstanding HARQ process that started out at the earliest time (i.e. has the earliest time stamp) with empty HARQ processes being deemed to arrive at the current time.

Third, the HARQ selection may be based on selecting the HARQ process by computing a "deadline" that balances the arrival time and the RREB. The HARQ processes can then by ranked according to this deadline, D, which may be computed as:

$$D = S(B/R) + a_h$$

where S is a system stretch value, which is a reflection of the true service experienced by a job with respect to the ideal performance that it would have experienced if all resources were to be allocated to the job and it was serviced without interruption; B is the packet size of the previously transmitted packet; R is the Shannon capacity, which is known to those skilled in the art; and $a_{f_r}$ is the time instant of the first transmission. The HARQ process with the lowest deadline may be selected for retransmission.

If none of the outstanding HARQ processes are currently free or there are no replacement packets that need to be transmitted, then any one of the free HARQ processes may be selected to transmit a new packet.

Once the "best" HARQ process for a given one of the mobile devices has been computed, the technique 200 may select that HARQ process as the HARQ process for a particular user, as indicated in block 206. In alternate embodiments, the ILPDRM module 56 may delay selecting a HARQ processes and treat each HARQ process as a different user for the purposes of selecting the highest priority user later in the technique 100, depicted in FIG. 3A.

Once the HARQ process for the first mobile device 24a, b, c, and d has been computed, the technique 200 may change to a next user, as indicated in block 208 and determine the "best" HARQ process for the second user. The technique 200 may continue in this manner until the "best" HARQ process has been determined for each of the mobile devices 24a, b, c, and d.

Returning now to FIG. 3a, once the HARQ process has been selected, the technique 100 may continue by computing control channel overheads, computing available power for packet data channels by subtracting the control channel overheads from the available power, as indicated in block 106. In one embodiment, the RNC 14 or the receiver module 52 may provide a measurement of available power and the control channel overheads, and the ILPDRM module 56 may compute the available power for the packet data channels Next, the technique 100 may involve determining a channel rate for each traffic stream or user, as indicated in block 108. The channel rate is the ratio of the number of information bits (in a packet) to frame duration. Determining the channel rate may comprise determining the supportable packet sizes for the user or traffic stream. An initial packet size may serve as a starting point for calculating which packet sizes are supportable. If the transmission is a replacement packet, the initial packet size will match the size of the original packet. If the transmission is not a replacement packet, the initial packet size may be provided by the mobile device 24a, b, c, or d or the cellular system 10.

Once the initial packet size has been set, the ILPRDM module 56 may determine from the available Walsh codes and the available power whether a channel rate corresponding to the initial packet size is supportable. In one embodiment, this may comprise accessing a Look-up Table ("LUT"), such as the exemplary LUT illustrated in FIG. 5, which is generally designated by a reference numeral 250. This LUT 250 may comprise a listing of possible packet sizes supported by the cellular system 10, with each packet size corresponding to a number of required Walsh codes, a type of modulation, and a chip energy used to transmit that packet size with a 1% FER given additive white Gaussian noise, which is an approximation for the air interface.

Figure 5:
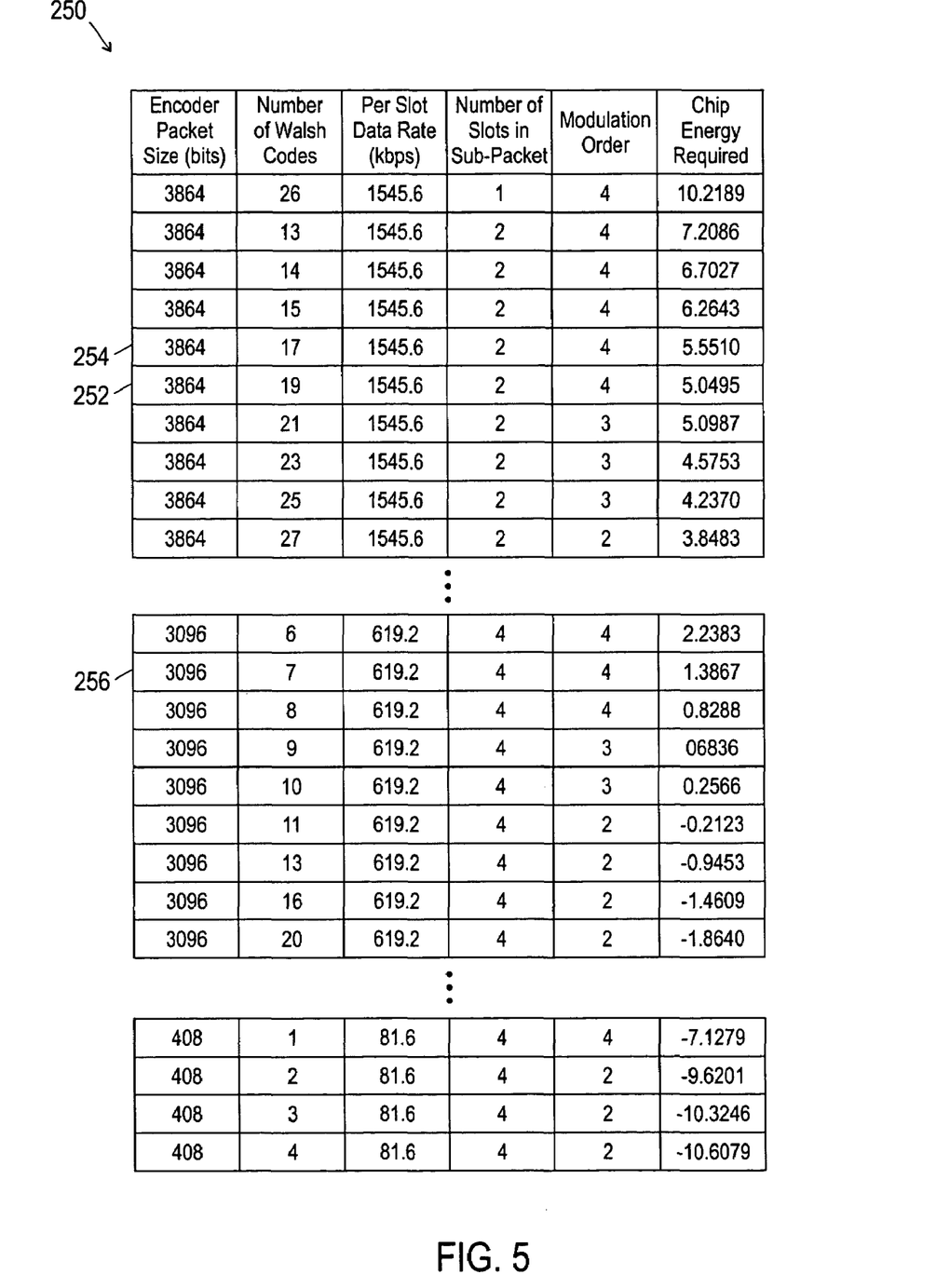
FIG. 5 illustrates an exemplary look-up table for determining a channel rate in accordance with exemplary embodiments of the present invention.

It is possible to use the LUT 250 to determine the supportable channel rate because the channel rate is fully deterministic (i.e., given the same set of inputs at any instant, the channel rate equations would produce the same outputs). Thus, the channel rates can be calculated offline based the possible combinations of available codes, available power, and frame durations in a particular system. In this way, it may be possible to determine the channel rate by merely accessing the line in the LUT 250 that corresponds to a particular number of available codes, a particular amount of available power, and a particular frame duration.

Those skilled in the art will appreciate that the LUT 250 is presented for illustrative purposes only. As such, the exemplary LUT 250 does not illustrate every possible packet size nor every possible permutation of codes, power, modulation, etc. within each packet size. Further, it will be appreciated that even those combinations of codes, power, and modulation illustrated in the LUT 250 are merely exemplary. In alternate embodiments, the values may be different. For example, in an embodiment configured to provide a 2% FER, the chip energies may be different.

By using the LUT 250, it may be possible to determine whether a packet size is supportable given a particular number of available codes and a particular amount of available power by determining if there exists at least one line in the LUT 250 containing the initial packet size, a number of codes that is less than the available number of codes, and a chip energy that is less than the available power. For example, looking to the exemplary LUT 250, if the initial packet size was 3864 bits, there were 20 available codes, and the available chip energy (i.e., the available power) is 5.566 dB, then a line 252 in the LUT 250 indicates that a packet size of 3864 bits would be supportable across two slots (i.e. a frame duration of 2.5 ms) and a modulation order of four (4 bits modulation). However, if there had only been 7 available codes and the available chip energy was only 1.7 dB, then the 3864 bit packet size would not have been supportable because no line in the LUT 250 matches those values.

If the initial packet size is supportable, the ILPDRM module 56 may execute a loop to compute the minimum number of Walsh codes needed to transmit the supportable packet size. In the first example above, this may mean determining that only 17 codes are needed to support a packet size of 3864 bits with a chip energy of 5.566 dB because a line 254 in the LUT 250 matches the values, but requires fewer codes than the line 252.

If the initial packet size is not supportable, the ILPDRM module 56 may execute a loop to compute the largest packet size that is supportable. For example, in the second example given above where there were only 7 available codes and the available chip energy was only 1.7 dB, it may be possible to transmit using a packet size of 3096 bits, with 7 codes, across 4 slots (i.e. a frame duration of 5 ms), with a modulation order of 4, and a chip energy of 1.7 dB. This may be determined because the line 256 of the LUT 250 supports these values.

If even the smallest available packet size is not supportable, the ILPRDM module 56 may compute an aggression factor for supportability, $AF_{supp}$. The $AF_{supp}$ reduces the chip energies on the LUT 250. For example, if the chip energy for supportability on the LUT was reduced by 1 dB, formerly unsupportable traffic streams may then have a supportable packet size. While lowering the chip energy threshold based on $AF_{supp}$ is artificial (i.e., not based on the channel condition), the $AF_{supp}$ permits traffic streams to be considered for transmission even if the smallest packet size is not supportable in a single frame. In alternate embodiments, the aggression factor may also be increased as an alternative to reducing the packet size. In still other embodiments, the supportable packet size may be computed on-the-fly instead of being stored in the LUT 250.

It is important to note that the ILPDRM module 56 may compute the maximum supportable packet size for a variety of possible frame durations. For example, in the case of 1×EV-DV, it may compute three packet sizes corresponding to the three possible frame durations 1.25 ms (one slot on the LUT 250), 2.5 ms (two slots on the LUT 250), and 5 ms (four slots on the LUT 250). However, those skilled in the art will appreciate that in an embodiment, such as HSDPA, that only supports only a single frame duration (e.g., 2 ms), the LUT 250 may only include channel rates corresponding to that one frame duration. In this embodiment, the ILPDRM module 56 may only determine the packet size corresponding to the single frame duration.

Once the channel rates for each of the traffic streams have been determined, the technique 100 may determine the ideal channel rate for each traffic stream or user corresponding, as indicated in block 10. In one embodiment, the ideal channel rate CR(u, n) for a user u at instant n may be represented mathematically as:

$$CR(u, n) = \frac{R_{per-code}(u, n, T_{cr})}{AF_{coef}(u, n, \sigma^2)} * W_{avail}(n)$$

where $R_{per-code}$ is a data rate available for each code, $AF_{coef}$ is an aggression factor coefficient, and $W_{avail}$ is total the number of Walsh codes available for transmitting packet data. More specifically, $R_{per-code}$ may be defined as:

$$R_{per-code}(u, n, T_f) = \frac{TR(u, n, T_f)}{W(u, n, T_f)}$$

where TR represents a data transmission rate and W represents the minimal number of code allocations. For example, looking at the line 252 in the LUT 250, the $R_{per-code}$ may be calculated by dividing the per frame data rate, $TR(u,n,T_f)$ by the number of Walsh codes, $W(u,n,T_f)$.

$AF_{coef}$ represents the combination of the $AF_{supp}$ that was described earlier and a mean squared error aggression factor, $AF_{mse}$ that accounts for Doppler effects during transmission. $AF_{coef}$ may be divided out of the $R_{per-code}$ to remove any artificially imposed effects and any Doppler effects when computing the ideal channel rate. Lastly, $W_{avail}$ is the total number of codes available in the base station 22a, b. This number of codes is used even if all of the codes are not needed to support a particular packet size. For example, even if only 17 or 20 codes are needed to support the packet size, the $W_{avail}$ would be 20 and not 17 because a total of 20 codes are available.

It is important to note that the ideal channel rate is an ideal rate of transmission and may not reflect the actual transmission rate that is actually used by the base station 22a, b. As will be described further below, even if a traffic stream is the highest priority traffic stream, this ideal channel rate may be lowered to improve the overall throughput of the cellular system 10 or because of transmission limitations in the cellular system 10.

Once the ideal channel rate for each traffic stream has been determined, the technique 100 may compute deadlines for each traffic stream and rank the traffic streams, as indicated in block 112 of FIG. 3. In one embodiment, the deadline may be computed using the channel rate for each traffic stream in conjunction with the QoS parameters and GoS class of the traffic stream. Specifically, the deadline for each traffic stream may computed by choosing the lesser of (1) the ratio of the job size to the channel rate multiplied by a weight reflecting the QoS parameters and GoS Class of the traffic stream, and multiplied by the system stretch value, which is a reflection of the true service experienced by a job with respect to the ideal performance that it would have experienced if all resources were to be allocated to the job and it was serviced without interruption plus the arrival time of the job at the base station 22a, b and (2) the arrival time of the job at the base station 22a, b plus a maximum delay associated with the particular type of traffic.

This calculation may be represented mathematically as:

$$D(u, s, n) = \min\left\{W(u, s, n)S(n)\frac{J(u, s, n)}{CR(u, s, n)} + a(u, s), (a(u, s) + \Delta(u, s))\right\}$$

where W(u,s,n) represents the weight attached to the stream based on QoS parameters and GoS classes, S(n) is the system stretch, J(u,s,n) is the job size (i.e., the number of bits or bytes for stream s of user u at time slot n, CR (u,s,n) is the ideal channel rate for a particular traffic stream, a(u,s) is the arrival time of the job at the base station 22a, b, and Δ(u,s) is the maximum delay permitted for that particular type of traffic. For best effort traffic (i.e., delay tolerant), such as web pages or FTP, the Δ(u,s) may be set at infinity. In one embodiment, W(u,s,n) may be calculated by the OLPDRM module 54 and transmitted to the ILPDRM module 56.

Once the deadlines have been calculated for each of the traffic streams, the ILPDRM module 56 may rank the traffic streams based on their deadlines, as indicated in block 114. It is important to note that technique for ranking the traffic streams outlined above is merely one example of a ranking technique and is not intended to exclusive. In alternate embodiments, the ranking technique may be different.

If the highest-priority user does not need all the resources for supportability of the computed transmission format, allocating all of the resources exclusively to the highest-priority user could be sometimes wasteful. Therefore, it is often prudent to allocate to the highest-priority user only as much power and Walsh codes as necessary, and allocate the rest to additional users. To accomplish this step, however, it may be important to identify additional users (and their appropriate resource allocations and transmission formats). It is important to note that in 1×EV-DV, only one additional user may be added whereas in non-1×EV-DV embodiments, the limit may be much higher or there may be no limit on the number of users. Further, in 1×EV-DV embodiments, if two users are scheduled simultaneously, they are required to have the same frame duration (recall from above that unlike HSDPA, 1×EV-DV permits multiple frame durations).

Figure 3B:
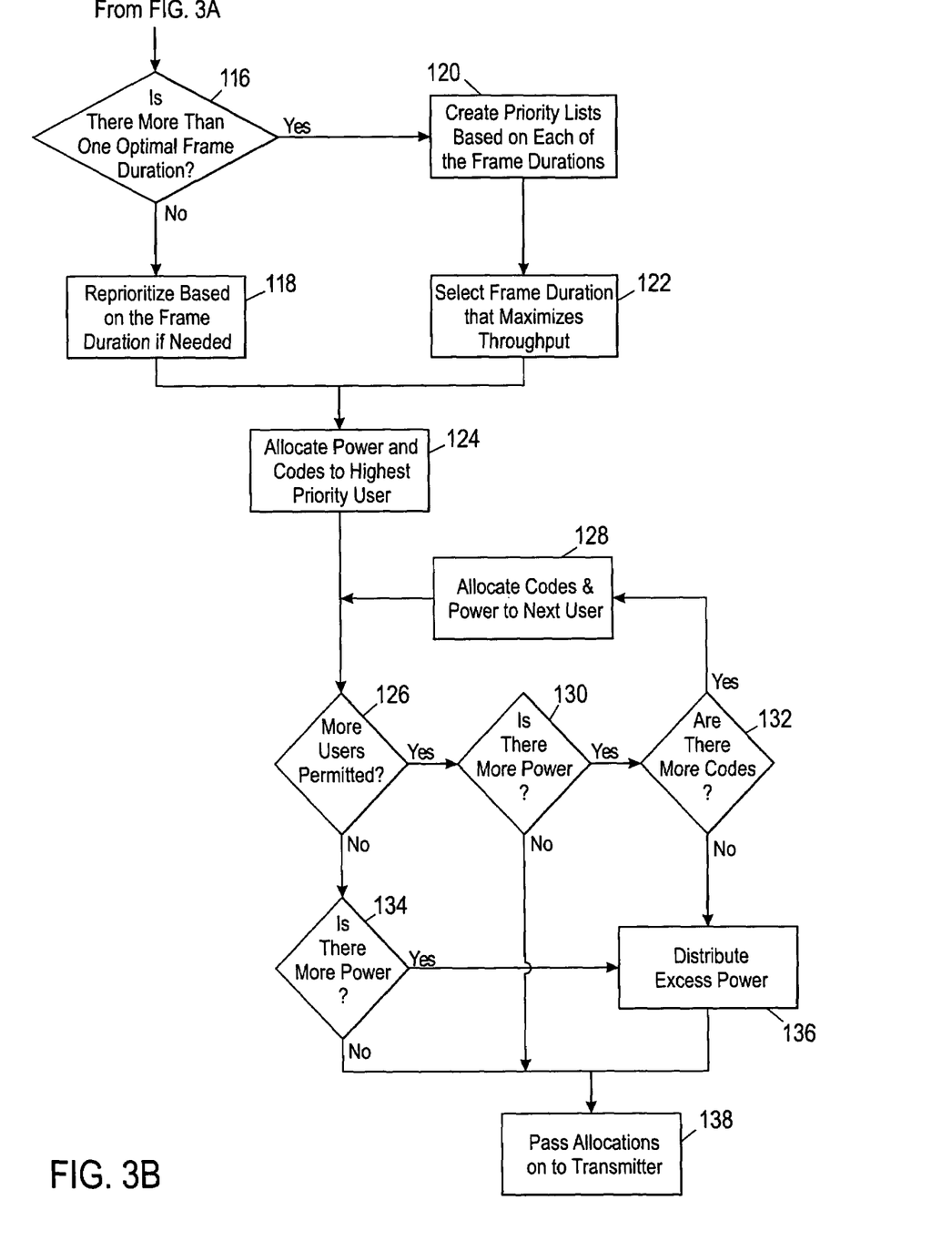
FIG. 3B illustrates a flow chart illustrating an exemplary technique for allocating power and codes amongst a plurality of users in accordance with exemplary embodiments of the present invention.

Returning now to the technique 100, after the traffic streams have been ranked, the technique 100 may seek to determine a transmission format for the highest priority traffic stream. Turning next to FIG. 3B, which is a continuation of the technique 100 illustrated in FIG. 3A, the ILPDRM module 56 may have to determine whether there is more than one optimal frame duration to determine the transmission format, as indicated in block 116. Recall from above that, depending on the embodiment, there may be more than one frame duration capable of transmitting the largest supportable packet size for the highest priority user. If there is more than one frame duration that supports the largest supportable packet size, these frame durations may be from a set of shortlisted frame durations, which may be referred to as T shortlist (u1).

In this case, the choice of a transmission format may be deferred until the next "best" user or users can be determined. In the case of a 1×EV-DV embodiment, only the next best user may be considered, but in other embodiments, a multitude of different users may be considered.

Once the shortlist of transmission formats has been assembled, the technique 100 may reprioritize the users except u1 based on each of the frame durations in T shortlist (u1), as indicated in block 120. This may be done because the deadlines calculated above were computed using an ideal channel rate without regard to frame duration. It may be helpful to reprioritize the users besides u1 based on the frame durations in T shortlist and taking into account the power and codes already allocated to u1.

In one embodiment, this reprioritization comprises first updating the available power fraction to account for the highest priority user $u_1$ (i.e., subtract the power and codes required for the highest priority user from the available power and codes). Next, for each shortlisted frame in T shortlist, a largest packet size, B(u, n, T shortlist, CDM) supportable by the available power and codes derived above is computed, wherein the packet size is subject to that allowed by the number of bits in the queue and the capability of the mobile device 24a, b, c, and d. Mathematically, this can be represented as:

$$B(u, n, T\text{shortlist}, CDM) = \min\{B\max(u, n, T\text{shortlist}, W\text{perm}, CDM), Bq(u, n, CDM)\}$$

In the event of a HARQ retransmission, those skilled in the art will appreciate that the actual transmitted packet size is fixed to that used for previous transmissions but an aggression factor parameter increase may be considered. The corresponding data rate for the shortlisted values of frame duration can then be represented mathematically as:

$$R_{cdm}(u, n, T_{shortlist}) = \frac{B(u, n, T_{shortlist}, CDM)}{AF_{coef}(u, n, \overline{\sigma^2}) * T_{shortlist}}$$

The above channel rate computation process may be performed for all users in the user pool, except the first user, for each of the frame durations in T shortlist, and the user pool may be reprioritized using the deadline and ranking technique described above in conjunction with the new channel rate. Once this re-ranking is complete, the users in each of the reprioritized lists may be labeled respectively as u2, u3, u4, etc., based on their ranking. The ILPDRM module 56 may then select the frame duration from T shortlist that maximizes the throughput from u1 and however many secondary users (i.e., u1, u2, etc.) that the base station 22a, b may support, as indicated in block 122. For example, in the case of a 1×EV-DV embodiment, the ILPDRM module 56 may select the frame duration to maximize the throughput from u1 and u2 because 1×EV-DV only permits broadcast to two users per frame. Alternate embodiments may differ.

Returning to the block 116, if there is only one frame duration that supports the largest packet size (e.g., an HSDPA embodiment), then this frame duration may be selected as the transmission format. The user pool excluding the highest priority user may be reprioritized as described above based on the frame duration of the highest priority user, as indicated by block 118. The action may performed if the ranking based on the ideal channel rate involved multiple frame durations (e.g. 1×EV-DV). Even though the highest priority user only has one supportable frame duration, it does not necessarily follow that the second highest priority user based on ideal channel rate would have the same frame duration. For this reason, it may be helpful to reprioritize the remaining users except u1, as outlined above. Those skilled in the art will appreciate that the reprioritization may be redundant (and thus unneeded) in an HSDPA embodiment because there was only one available frame duration from the beginning. Further, in some embodiments, users may also not be reprioritized even though multiple frame durations support the largest packet size for the highest priority user.

After the transmission format has been selected, the ILPDRM module 56 may allocate power and codes to the highest priority user u1, as indicated in block 124. The ILPDRM module 56 may then determine whether additional users are permitted, as illustrated in block 126. This step may be included in the technique 100 because certain embodiments may include artificial limits on the number of users that may share the power and codes in each frame. For example, 1×EV-DV limits the number of users to two. If more users are permitted, the ILPDRM module 56 may determine whether there is any unallocated power, as indicated in block 130. If there is more power to allocate, the ILPDRM module 56 may determine whether or not there are any more unallocated Walsh codes, as indicated in block 132. If there are additional codes, the ILPDRM module 56 may allocate the unallocated codes and power to the next highest priority user, as indicated in block 128. After allocating some or all of the unallocated power and codes, the technique 100 may loop back to the block 126.

If, however, there are no more codes to allocate, after block 132, the ILPDRM module 56 may distribute any remaining power to those users that have been already been allocated codes, as indicated in block 136. The technique 100 may also distribute excess power if no more users are permitted (block 126) but there is still unallocated power (block 134). In this case, the ILPDRM module 56 may also distribute any unallocated codes to those users that have already been allocated power and codes.

Once the power and codes have been allocated, the ILPDRM module 56 may pass the identities of the users along with their associated transmission formats to the transmitter 60 for transmission to the mobile devices 24a, b, c, and d, as indicated in block 138. It is important to note that most base station 22a, b have distinct transmission rates upon which to transmit signals. For example, even though the allocation of power and codes may permit the transmission of 400 kbits per second, the base station 22a, b may be configured to transmit only at either 380 kbits per second or at 420 kbits per second. In this case, the typical base station 22a, b may be configured to transmit at the lower transmission rate.

By more efficient allocation of transmission resources, such as Walsh codes and power, the techniques outlined above may improve the management of packets in packet transmission networks, such as a 1×EV-DV network or a HSDPA network. Improving the management of packets, in turn, may permit the packet transmission network to support more mobile devices and to provide improved service to users.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method for allocating transmission resources in a base station comprising:
   determining a largest supportable packet size for a highest priority user;
   determining the total amount of transmission power available for packet transmission;
   determining the total number of codes available for packet transmission;
   identifying the highest priority user from a plurality of users by determining a channel rate for each of the plurality of users;
   identifying a second highest priority user;
   allocating transmission power and codes to the highest priority user; and
   allocating transmission power and codes to the second highest priority user, wherein the transmission power allocated to the second highest priority user does not exceed the total amount of transmission power minus the transmission power allocated to the highest priority user and wherein the number of codes allocated to the second highest priority user do not exceed the total number of codes minus the codes allocated to the highest priority user.

2. The method, as set forth in claim 1, comprising, wherein the determination of the largest supportable packet size is based at least partially on a combination of available modulation types, a total number of codes available for packet transmission, a total amount of available transmission power available for packet transmission, and frame durations supported by a base station,
   and the method further comprising:
   determining a transmission format, wherein the transmission format is partially based on the largest supportable packet size for the highest priority user.

3. The method, as set forth in claim 2, wherein determining the channel rate for each of the plurality of users comprises determining the largest supportable packet size.

4. The method, as set forth in claim 2, wherein identifying a highest priority user from the plurality of users comprises calculating a deadline for each of the plurality of users.

5. The method, as set forth in claim 4, wherein calculating a deadline for each of the plurality of users comprises calculating a deadline based partially on the Grade of Service of each of the plurality of users.

6. The method, as set forth in claim 2, wherein identifying a second highest priority user comprises computing a second deadline for each of the plurality of users except the highest priority user, wherein the second deadline is at least partially based on the transmission format.

7. The method, as set forth in claim 2, wherein determining a transmission format comprises:
   determining a set of transmission formats that support the largest supportable packet size; and
   selecting the transmission format from the set of transmission formats that maximizes the total number of bits transmitted to the highest priority user and the second highest priority user.

8. The method, as set forth in claim 2 comprising selecting a hybrid automatic repeat request process for each of the plurality of users.

9. The method, as set forth in claim 2, comprising transmitting a signal to the highest priority user in the transmission format.

10. The method, as set forth in claim 2, wherein the base station comprises a base station configured to provide high speed downlink packet access.

11. The method, as set forth in claim 2, wherein the base station comprises a base station configured to provide 1x Evolution Voice—Data Voice service.

12. The method, as set forth in claim 2, comprising dividing any power not allocated to the highest priority user or the second highest priority user between the highest priority user and the second highest priority user.

13. The method, as set forth in claim 2, comprising:
   identifying a third highest priority user;
   allocating transmission power and codes to the third highest priority user, wherein the transmission power allocated to the third highest priority user does not exceed the total amount of transmission power minus the transmission power allocated to the highest priority user and the transmission power allocated to the second highest priority user.

14. The method, as set forth in claim 2, comprising determining a pool of instantaneously active users and wherein the plurality of users comprises the pool of instantaneously active users.

15. A method for allocating transmission resources in a base station comprising:
   determining the total amount of transmission power available for packet transmission;
   determining the total number of codes available for packet transmission;
   identifying the highest priority user from a plurality of users by determining a channel rate for each of the plurality of users;
   identifying a second highest priority user;
   determining a transmission format, wherein the transmission format is partially based on the largest supportable packet size for the highest priority user;
   allocating transmission power and codes to the highest priority user; and
   allocating transmission power and codes to the second highest priority user, wherein the transmission power allocated to the second highest priority user does not exceed the total amount of transmission power minus the transmission power allocated to the highest priority user and wherein the number of codes allocated to the second highest priority user do not exceed the total number of codes minus the codes allocated to the highest priority user.

16. The method, as set forth in claim 15, wherein determining the channel rate for each of the plurality of users comprises determining the largest supportable packet size.

17. The method, as set forth in claim 16, wherein identifying a highest priority user from the plurality of users comprises calculating a deadline for each of the plurality of users.

18. The method, as set forth in claim 17, wherein calculating a deadline for each of the plurality of users comprises calculating a deadline based partially on the Grade of Service of each of the plurality of users.

19. A method for allocating transmission resources in a base station comprising:
   determining the total amount of transmission power available for packet transmission;
   determining the total number of codes available for packet transmission;
   identifying the highest priority user from a plurality of users by determining a channel rate for each of the plurality of users;
   identifying a second highest priority user;
   determining a transmission format, wherein the transmission format is partially based on the largest supportable packet size for the highest priority user;

allocating transmission power and codes to the highest priority user;

allocating transmission power and codes to the second highest priority user, wherein the transmission power allocated to the second highest priority user does not exceed the total amount of transmission power minus the transmission power allocated to the highest priority user and wherein the number of codes allocated to the second highest priority user do not exceed the total number of codes minus the codes allocated to the highest priority user; and dividing any power not allocated to the highest priority user or the second highest priority user between the highest priority user and the second highest priority user.

* * * * *